INVENTOR.
THEODORE R. BLACK
BY
HIS ATTORNEYS

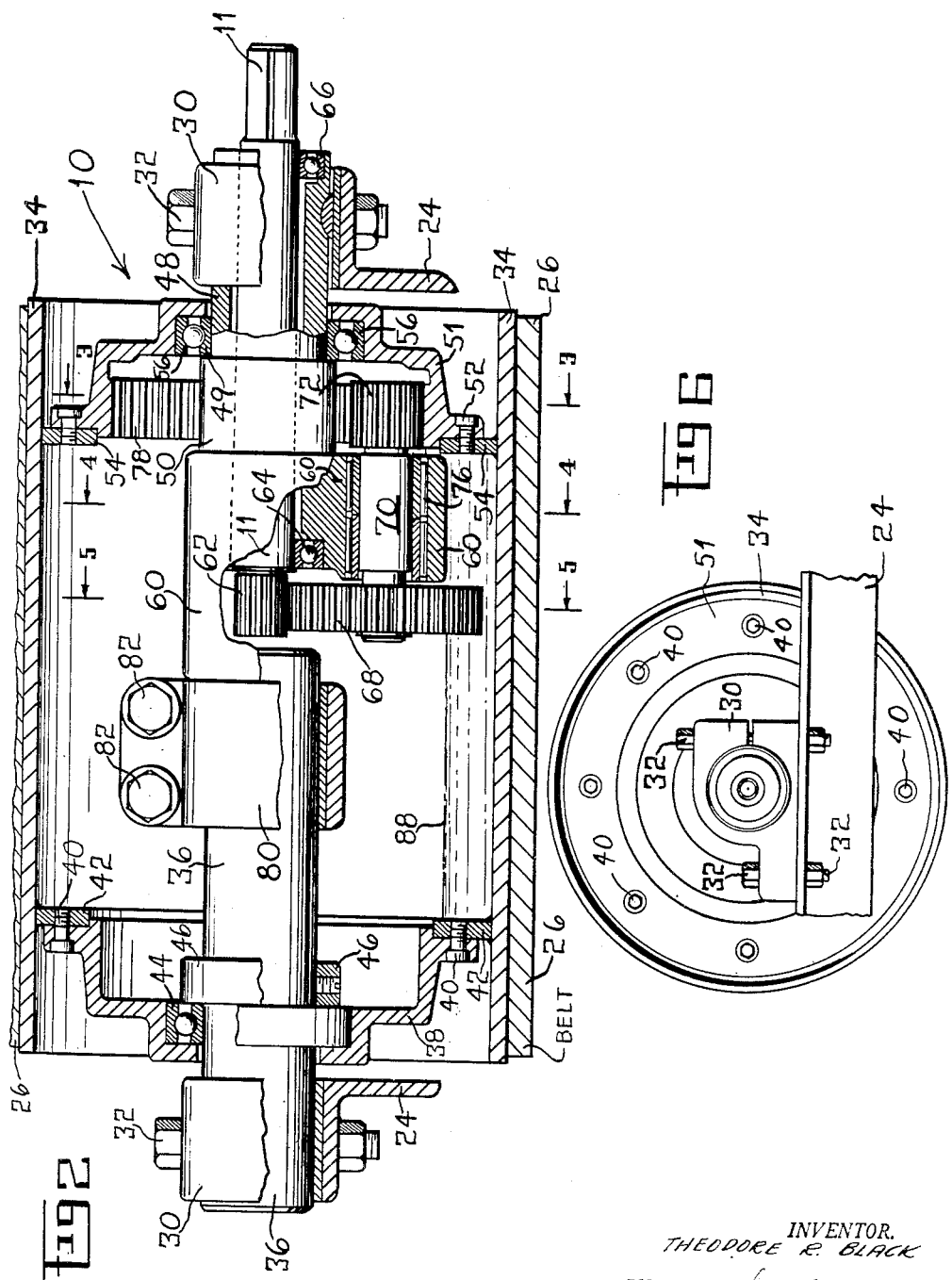

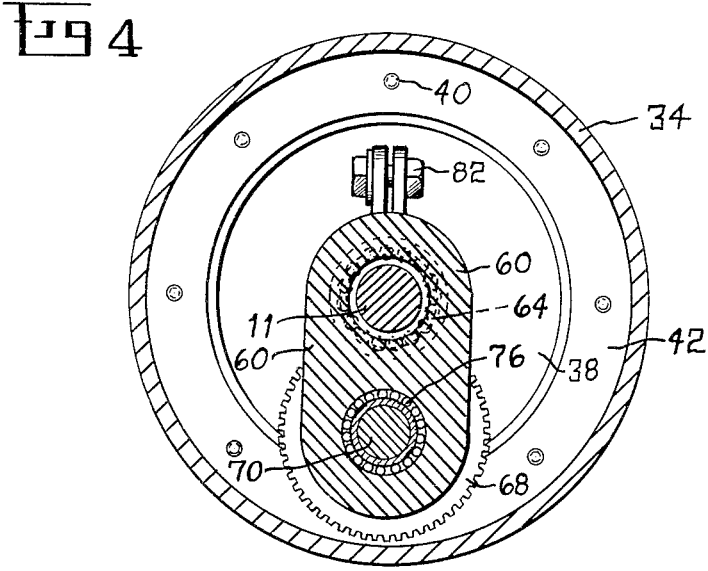
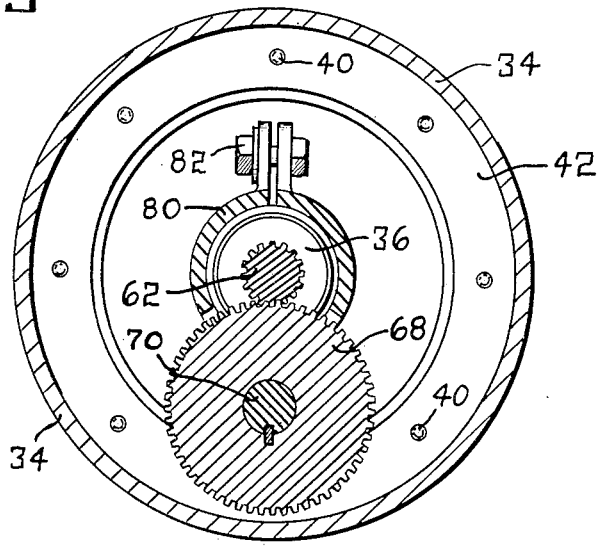

United States Patent Office 2,779,205
Patented Jan. 29, 1957

2,779,205

SELF-CONTAINED MECHANICAL POWER TRANSMISSION UNIT

Theodore R. Black, Tripp City, Ohio, assignor to The Concentro-Drive Company, Inc., Piqua, Ohio, a corporation of Ohio Application September 30, 1953, Serial No. 383,273

2 Claims. (Cl. 74—421)

This invention relates to a self-contained mechanical power transmission unit. It relates particularly to a mechanical drive unit for a conveyor or a chain; however, the invention is not so limited, in that it may be applied to various types of mechanical drive applications.

A problem has long existed in the art of mechanical drive devices, in that an assembly providing a rotational speed ratio between the driving element and driven element has required a separate gear unit. When a gear unit was employed, a considerable amount of additional space was required. The gear units which have been necessary in a speed change drive assembly having a substantial speed ratio have occupied considerable space, either adjacent the drive unit or adjacent the driven unit, or between the drive unit and the driven unit. Naturally, the requirement of additional space is usually objectionable.

Furthermore, the gear unit employed in a speed change system has caused extra maintenance problems which have been undesirable.

Hence, it is an object of this invention to provide a self-contained mechanical power transmission unit for belts, chains and the like which includes within itself means for a substantial ratio in speed between the driving element and the driven element, thus requiring no additional space for a separate gear unit.

A further object of this invention is to provide a speed changing mechanical drive unit for belts, chains and the like which is compact and has a minimum of moving parts.

Other objects and advantages reside in the construction of parts, the combination thereof and the mode of operation, as will become more apparent from the following description.

Referring to the drawings, Figure 1 is a perspective view disclosing a mechanical drive unit of this invention applied to driving a conveyor belt.

Figure 2 is a side sectional view of a mechanical drive unit of this invention.

Figure 4 is a sectional view, taken substantially on line 4—4 of Figure 2.

Figure 5 is a sectional view, taken substantially on line 5—5 of Figure 2.

Figure 6 is an end view of a mechanical drive unit of this invention.

Figure 1:
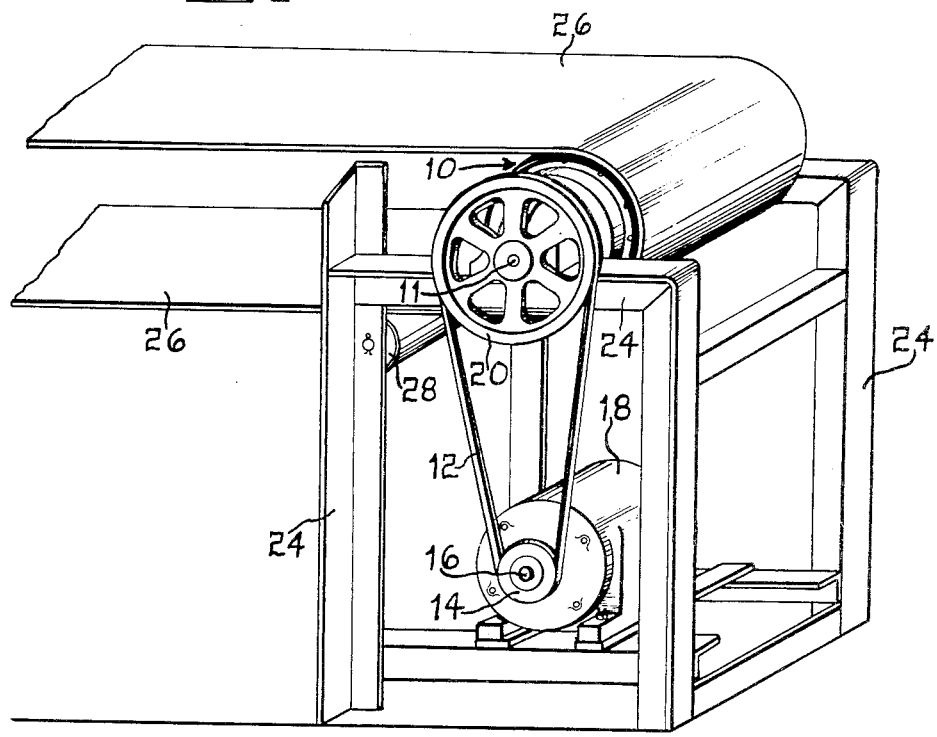
Figure 3:
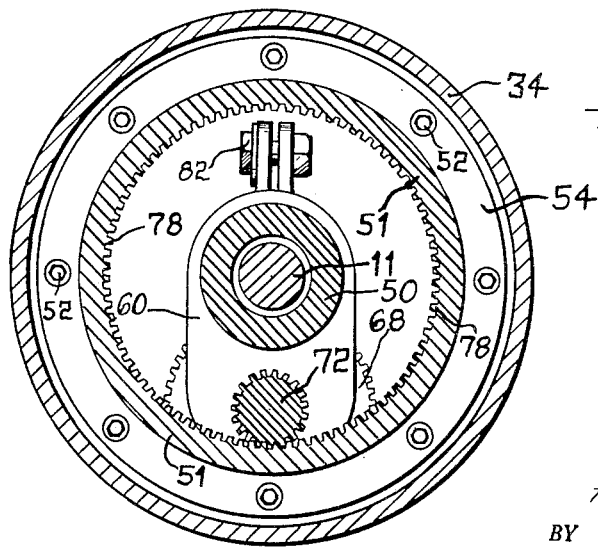
Figure 3 is a sectional view, taken substantially on line 3—3 of Figure 2.

Referring to the drawings in detail, reference numeral 10 indicates generally a mechanical power transmission unit of this invention provided with a drive shaft 11. The drive shaft 11 of the mechanical power transmission unit 10 may be rotatively driven by any suitable means, such as a V belt 12 engaging a pulley 14 mounted on a shaft 16 of a drive motor 18 and a pulley 20 mounted on the shaft 11 of the mechanical drive unit 10. The drive motor 18 and the mechanical drive unit 10 are mounted upon any suitable framework 24 providing support for the mechanical drive unit 10 and for a conveyor belt 26. A guide roller 28 is also mounted upon the framework 24 adjacent the mechanical drive unit 10 and aids in supporting the conveyor belt 26, as shown in Figure 1.

The mechanical drive unit 10 is secured to the framework 24 by means of clamping members 30 provided with bolts 32. The conveyor belt 26 is carried upon a drive cylinder 34. Extending into the drive cylinder 34 at one end thereof is a solid support stem 36 which is clamped by one of the clamping members 30.

A flanged wheel 38 is joined by means of bolts 40 to a ring 42 which is attached by any suitable means (such as by welding) to the drive cylinder 34 adjacent one end thereof. The flanged wheel 38 is rotatably supported upon the solid support stem 36 by means of an anti-friction bearing 44. A clamp ring 46 aids in retaining the anti-friction bearing 44 in proper longitudinal position upon the solid support stem 36.

Extending within the drive cylinder 34 at the end opposite the solid support stem 36 is a hollow support stem 48 retained upon the framework 24 by means of one of the clamping members 30. The hollow support stem 48 has a shoulder 49, forming an extending collar section 50 within the drive cylinder 34.

A flanged wheel 51 is joined to the drive cylinder 34 by means of bolts 52 threadedly engaging a ring 54 which is attached to the drive cylinder 34. The flanged wheel 50 is rotatably supported upon the hollow support stem 48 by means of an anti-friction bearing 56. The drive shaft 11 extends through the hollow support stem 48 and into an inner housing 60 within the drive cylinder 34. The inner housing 60 is integrally attached to the extending collar section 50 of the hollow support stem 48. At the end of the drive shaft 11 within the inner housing 60 is attached a pinion gear 62. Supporting the drive shaft 11 adjacent the pinion gear 62 is an anti-friction bearing 64, the outer race of which is supported by the inner housing 60. Supporting the drive shaft 11 adjacent the end thereof opposite the pinion 62 is an anti-friction bearing 66, which is mounted upon the hollow support stem 48, as shown in Figure 2.

An intermediate gear 68 engages the pinion 62. The intermediate gear 68 is supported upon an intermediate shaft 70 at one end of which is attached the intermediate gear 68 and at the other end of which is attached an intermediate pinion 72. The intermediate shaft 70 is rotatably supported by an anti-friction bearing 76, which is retained within the inner housing 60. The intermediate pinion 72 drivingly engages a plurality of teeth 78 formed upon the inner surface of the flanged wheel 51. The inner housing 60 is rigidly attached to the solid shaft 36 by means of a clamping collar 80 retained by bolts 82. Lubricating oil is retained within the drive cylinder 34 to lubricate all the moving parts within the drive cylinder. The lubricating oil may have a depth as indicated by the line 88.

Thus, it may be understood that when the drive shaft 11 is rotatably actuated by any suitable means, such as by the motor 18 through the pulleys 14 and 20 and the belt 12, the drive cylinder 34 is caused to rotate at a speed different from the speed of the pulley 20. The drive shaft 11 rotates the pinion 62. Driving engagement of the pinion 62 with the intermediate gear 68 causes rotation of the intermediate shaft 70 and the intermediate pinion 72. As the intermediate pinion 72 rotatively engages the teeth 78 of the flanged wheel 51, the flanged wheel 51 is rotated and due to the fact that the flanged wheel 51 is attached through the ring 54 to the drive cylinder 34, the drive cylinder 34 is rotated upon the anti-friction bearings 44 and 56. Thus, the drive cylinder 34 may drive the conveyor belt 26. The drive cylinder 34 may also be adapted to drive any other suitable device, such as a chain, or wheel or other apparatus.

Therefore, it may be understood that in the use of the self-contained mechanical drive unit of this invention, there may be a large difference in the rotational speed of the driving element and the driven element, while a comparatively large amount of power is transmitted and a comparatively small amount of space is occupied by the equipment.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having described my invention, I claim:

1. In a self-contained mechanical power transmitting assembly comprising a cylindrical housing, a solid support stem extending into the housing at one end thereof, a wheel member attached to the cylindrical housing, a bearing rotatably supporting the wheel member upon the solid support stem, a flanged wheel attached to the cylindrical housing adjacent the other end of the cylindrical housing, the flanged wheel having radially disposed teeth, a hollow support stem extending into the cylindrical housing through the flanged wheel, an inner housing within the cylindrical housing, the inner housing being supported by the solid support stem and the hollow support stem, a drive shaft mounted within the hollow support stem and extending through the hollow support stem and having an end in the inner housing, a bearing retained by the inner housing engaging the drive shaft, a pinion gear attached to the end of the drive shaft within the inner housing, a bearing within the inner housing, an intermediate shaft supported by the bearing within the inner housing, an intermediate gear attached to one end of the intermediate shaft and in meshed relationship with the pinion gear, and an intermediate pinion attached to the other end of the intermediate shaft and in meshed relationship with the teeth of the flanged wheel.

2. In a self-contained mechanical power transmitting mechanism for conveyor units of the type provided with a belt, the combination comprising a drive cylinder for driving a belt, a flanged wheel attached adjacent each end of the drive cylinder, one of said flanged wheels being provided with teeth, a stem extending into the drive cylinder through each of the flanged wheels, a bearing upon each stem rotatably supporting one of the flanged wheels, one of said stems being a hollow stem, a support bearing attached to said hollow stem, a drive shaft rotatably supported upon said support bearing within said hollow stem, an inner housing within said drive cylinder rigidly supported by each stem extending into the drive cylinder, a pinion gear within said inner housing and attached to said drive shaft, an intermediate shaft rotatably supported by said inner housing, an intermediate gear attached at one end of said intermediate shaft and engaging said pinion gear, and an intermediate pinion attached at the other end of said intermediate shaft and in meshed engagement with said flanged wheel provided with teeth.

References Cited in the file of this patent
UNITED STATES PATENTS

| 2,439,521 | Miller | Apr. 13, 1948 |
| 2,500,485 | Conway | Mar. 14, 1950 |
| 2,675,711 | Le Tourneau | Apr. 20, 1954 |